United States Patent [19]

Dyma et al.

[11] Patent Number: 4,625,958
[45] Date of Patent: Dec. 2, 1986

[54] DOCUMENT FEEDING MECHANISM WITH PIVOTABLE INPUT CHUTE

[75] Inventors: Horst Dyma, Villingen-Schwenningen; Hans Bommersheim, Brigachtal; Otto Becker, Trossingen; Armin Heindke, Villingen-Schwenningen, all of Fed. Rep. of Germany

[73] Assignee: Kienzle Apparate GmbH, Fed. Rep. of Germany

[21] Appl. No.: 704,373

[22] Filed: Feb. 22, 1985

[30] Foreign Application Priority Data

Feb. 23, 1984 [DE] Fed. Rep. of Germany ... 8405504[U]

[51] Int. Cl.[4] .............................................. B65H 5/06
[52] U.S. Cl. ........................................ 271/274; 271/9
[58] Field of Search ..................... 271/272, 273, 274, 9

[56] References Cited

U.S. PATENT DOCUMENTS 3,661,383  5/1972  Morrison .............................. 271/273
4,124,204 11/1978  VanBuskirk ...................... 271/273 X

FOREIGN PATENT DOCUMENTS 52840  4/1980  Japan .................................... 271/274

Primary Examiner—Richard A. Schacher
Attorney, Agent, or Firm—Toren, McGeady, Stanger, Goldberg & Kiel

[57] ABSTRACT

A document feeding mechanism including a feed chute pivotally mounted on an axle to enable positioning of the input location for the documents is formed to include a power transmission mechanism for the document transport elements which power transmission mechanism is also carried by the same axle.

5 Claims, 1 Drawing Figure

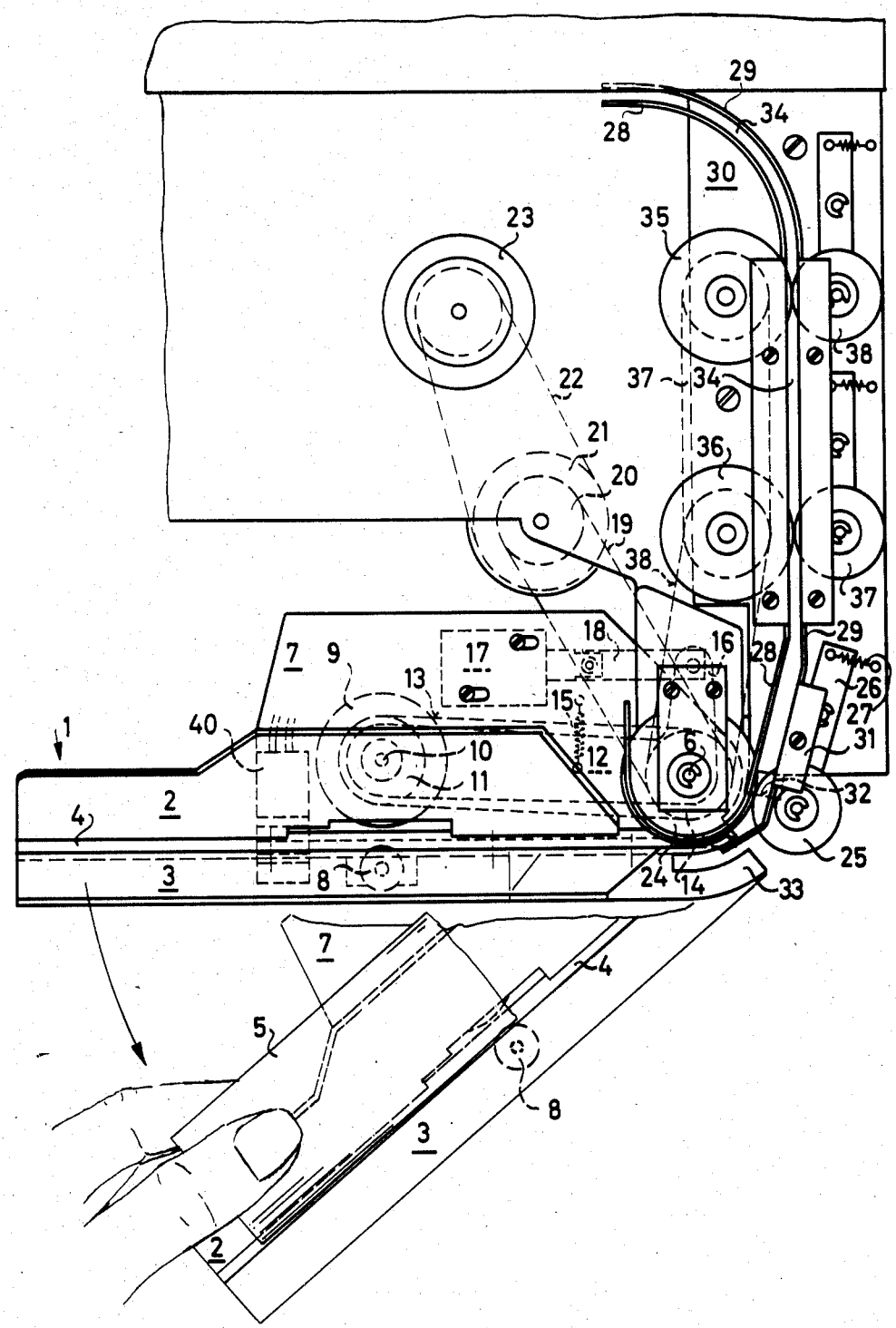

DOCUMENT FEEDING MECHANISM WITH PIVOTABLE INPUT CHUTE

The present invention relates generally to document feeding devices and more particularly to a feed chute for documents in a document encoding device containing document transport means which can be switched on and off.

The document encoding devices now in use are, as a rule, stationary devices, and models of these devices have the keyboards, the printer, the document input chute or chutes and also the document storage compartments all installed in a table. In such devices, it is evident that the parts of the document encoder which must be operated, including the keyboards and the document feed chutes, will be arranged in such a manner that they are within an ergonomically favorable reach.

However, certain disadvantages arise in document encoders of the prior art designed as stationary models in that their price tends to be relatively high and that such encoders involve certain restrictions with regard to location at a working site.

In view of the foregoing, there exists a general need to design such document encoders so that they are simpler and less expensive and so that they may particularly be arranged to operate as desk models. In such cases, the keyboard has been designed as a separate module so that the operator may have some choice with regard to the location of the keyboard and the encoding device and the manner in which they are to be arranged on a table relative to each other.

If, in such a situation, a fixed manual feed chute is utilized at the document encoder, then it will be necessary for the keyboard and for such a manual feed chute to be in an ergonomically correct position with respect to each other.

Accordingly, the present invention is directed toward insuring that, during the operation of the document feeding mechanism, the manual feed chute will be arranged at a convenient position for use by an operator.

SUMMARY OF THE INVENTION

Briefly, the present invention may be described as a document feeding mechanism for feeding documents in a document encoder comprising feed chute means which include a front and a rear guide part for guiding a document therebetween, document transport means adapted to be switched on and off and power transmission means for the document transport means. The feed chute means, including the front and rear guide parts, are pivotally supported on an axle so as to enable lateral pivotal movement thereof.

Furthermore, in accordance with the present invention, the power transmission means are also carried by the axle means which support the feed chute means.

In accordance with the invention, the feed chute for the documents in the document encoder is thus provided with transport means which can be switched on and off and the device is characterized in that the front and the rear document guide parts which define the boundaries for the feed chute are supported so as to be laterally pivotable on the axle or spindle which also carries the power transmission means for the document transport means.

In order to transport the documents from out of the feed chute safely into the document track, there is supported a further document transport means on the same pivoting axle as the feed chute so that these further transport means can then assume the transport function of the document out of the feed chute.

The document transport means arranged in the feed chute consist of a fixed pressing roll in the front guidance position and of a pivotably supported driving roll in the rear guidance portion. The driving roll can be pivoted into or out of engagement with the pressing roll by means of an electromagnet.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE DRAWING

In the drawing

FIG. 1 is a layout drawing showing the feed mechanism in accordance with the present invention.

DETAILED DESCRIPTION OF THE PREFERRED EMBODIMENT

Referring now to FIG. 1, there is shown a document feeding mechanism in accordance with the invention, wherein an input or feed chute 1 is formed to consist of a rear guide part 2 and a front guide part 3, between which a document transport track 4 is defined in order for documents 5 to pass therethrough. The parts 2, 3 and 4 which are preferably designed and formed from synthetic material, are collectively attached at a supporting structure 7 which, together with the parts 2, 3 and 4, is arranged to be pivotable about an axle 6.

On both sides of the transport track 4, there are arranged document transport means in recesses of the front and rear guide parts 2 and 3 which, on the one part, consist of a fixed pressing roll 8 and, on the other part, of a pivotably supported driving roll 9 which is formed from an elastic material having a high friction coefficient.

The drive roll 9 is connected with a driving transfer wheel 11 by means of an axle 10. All three of the parts 9, 10 and 11 are collectively supported on a lever 12 which is also pivotably supported on the axle 6. The drive transmission wheel 11 is arranged to be in drive connection with the drive transmission means by a drive belt 13 which engages a belt wheel 14 on the axle 6. The lever 12 located on the pivoting axle 6 is acted upon by a spring 15 which applies a force in the clockwise direction so that the drive roll 9 will be held out of engagement with the pressing roll 8.

An electromagnet 17 actuates an arm 16 of the lever 12 by means of a suitable linkage 18. As a result of actuation and operation of the electromagnet 17, the lever 12/16 is pivoted and, thus, the drive roll 9 is also pivoted in a counterclockwise direction so that the drive roll 9 will come into engagement with the pressing roll 8. As a result, the electromagnet 17 serves to switch the drive means for the document 5 on and off and if a document is inserted in the feed chute 1, an optotransmitter 40, which is also arranged in the feed chute, will scan the document 5 and it will operate to impart a switch-on signal in order to activate the electromagnet 17.

A further transmission belt wheel is supported on the axle 6 over which a belt 19 is engaged which, on the other hand, is supported on a belt wheel 20. The transmission is driven by a motor 23 by means of a further belt wheel 21 which is solidly connected with the belt wheel 20 and a belt 22.

In addition to the belt wheel for the belts 19 and 13 and the lever 12, an additional transport roll 24 for the documents 5 is arranged on the axle 6. This transport roll 24, which is firmly connected with the twin belt wheel 14, acts together with the pressing roll 25 which is rotatably arranged on the lever 26. Lever 26 and, thus, the pressing roll 25 are maintained in contact with the transport roll 24 by means of a spring 27. The two drive and pressing rolls 24 and 25 are also fabricated from a highly elastic material and serve to undertake the document drive out of the feed chute 1, if the drive is switched on by means of the motor 23 and by the electromagnet, whereby the drive roll 9 will be in contact with the pressing roll 8.

Guide parts 28 and 29 operate to guide the document along further portions of its path and these parts are supported and fixed at a chassis 30. The guide part 29 has an angled projection 31 with a lug 32 which serves as an abutment for the feed chute 1 with a nose 33 at the front of the guide part 3 abutting upon the lug 32 of the projection 31. Drive rolls 35 and 36 protrude additionally into the document transport track 34 and these rolls act together with pressing rolls 37 and 38.

The drive rolls 35 and 36 are also driven by the motor 23 by means of belts 37 and 38. The drive and pressing rolls 36, 37 and 35, 38 are arranged on their respective axles with a slightly oblique orientation relative to the lower plane of the transport track 34 so that the document 5 will, with its lower edge, always be maintained in contact with the lower end of the transport track 34 during the document transport process. As a result, the document 5 will always be adjusted to a specific level with respect to its lower edge.

After leaving the transport track 34, the document is taken over by additional transport means which will then direct it past the actual document encoding means.

As will be seen from the drawing, the feed chute 1 is pivotable around the axle 6 so that an operator may pivot and adjust the chute into what may be considered to be the most favorable ergonomic position. This may be accomplished in such a way that the position of the document encoder on table, and its position relative to the input keyboard, will no longer be critical.

The chassis 30 is arranged with a forward tilt so that the pivoting axis 6 will deviate somewhat from a position perpendicularly thereto in its arrangement. Thus, the feed chute 1 approaches the table top, if pivoted counterclockwise, and the chute height relative to the table is reduced so that the hand of an operator may rest on the table top during insertion of a document into the feed chute 1 without tiring.

While a specific embodiment of the invention has been shown and described in detail to illustrate the application of the inventive principles, it will be understood that the invention may be embodied otherwise without departing from such principles.

What is claimed is:

1. A document feeding mechanism for feeding documents in a document encoder comprising feed chute means including front and rear guide parts for guiding a document therebetween, document transport means adapted to be switched on and off, power transmission means for said document transport means, axle means pivotally supporting said front and rear guide parts so as to enable lateral pivotal movement thereof, said Power transmission means being also carried by said axle means, and additional document transport means supported on said axle means, said additional document transport means operating to undertake further transportation of documents after they are transported out of said feed chute means.

2. A document feeding mechanism for feeding documents in a document encoder comprising feed chute means including front and rear guide parts for guiding a document therebetween, document transport means adapted to be switched on and off, power transmission means for said document transport means and axle means pivotally supporting said front and rear guide parts so as to enable lateral pivotal movement thereof, said power transmission means being also carried by said axle means, wherein said document transport means comprise a fixed pressing roll arranged in a forward guiding position and a pivotally supported driving roll arranged in a rear guiding position.

3. A document feeding mechanism for feeding documents in a document encoder comprising feed chute means including front and rear guide parts for guiding a document therebetween, document transport means adapted to be switched on and off, said document transport means including a pivotally supporting driving roll, power transmission means for said document transport means and axle means pivotally supporting said front and rear guide parts so as to enable lateral pivotal movement thereof, said power transmission means being also carried by said axle means, wherein said pivotally supported driving roll includes drive transmission means and is supported on said axle means by means of a lever which is pivotable around the same pivot point as said feed chute means, said mechanism further including electromagnet means for effecting said pivoting in such a manner that said electromagnet means receives swith-on and switch-off impulses for initiation of transport motions of documents through said mechanism thereby operating to move said documents out of said feed chute means to enable introduction of subsequent documents.

4. A mechanism according to claim 1, 2 or 3, further comprising a chassis upon which said document feeding mechanism is supported, said axle being arranged to deviate from a position perpendicularly relative to said chassis.

5. A mechanism according to claim 1, 2 or 3, wherein said document transport means are formed of elements which comprise highly elastic material.

* * * * *